(12) United States Patent
Yogaraj et al.

(10) Patent No.: US 12,299,723 B2
(45) Date of Patent: May 13, 2025

(54) DIGITAL AND PHYSICAL EXPERIENCE CORRELATION FOR PRODUCT RECOMMENDATION

(71) Applicant: International Business Machines Corporation, Armonk, NY (US)

(72) Inventors: Kavitha Hassan Yogaraj, Bangalore (IN); Aaron K. Baughman, Cary, NC (US); Shikhar Kwatra, San Jose, CA (US); Tiberiu Suto, Franklin, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

(21) Appl. No.: 17/709,537

(22) Filed: Mar. 31, 2022

(65) Prior Publication Data
US 2023/0316374 A1    Oct. 5, 2023

(51) Int. Cl.
*G06Q 30/0601* (2023.01)
*G06F 16/2452* (2019.01)

(52) U.S. Cl.
CPC ... *G06Q 30/0631* (2013.01); *G06F 16/24522* (2019.01); *G06Q 30/0627* (2013.01); *G06Q 30/0643* (2013.01)

(58) Field of Classification Search
None
See application file for complete search history.

(56) References Cited

U.S. PATENT DOCUMENTS

| | | |
|---|---|---|
| 8,370,360 B2 | 2/2013 | Mo |
| 9,852,234 B2 | 12/2017 | Gannon |
| 9,949,519 B2 | 4/2018 | Koh |
| 10,438,603 B2 | 10/2019 | Chang et al. |
| 10,799,134 B2 | 10/2020 | Sitt et al. |
| 10,872,243 B2 | 12/2020 | Saitwal et al. |
| 11,049,164 B2 | 6/2021 | Agrawal et al. |
| 2015/0026084 A1 | 1/2015 | Guo et al. |
| 2017/0365102 A1* | 12/2017 | Huston ............ A63F 13/65 |

(Continued)

FOREIGN PATENT DOCUMENTS

| | | |
|---|---|---|
| CN | 103400274 B | 6/2016 |
| CN | 113266869 A | 8/2021 |

(Continued)

OTHER PUBLICATIONS

English translation.*

(Continued)

*Primary Examiner* — Michelle T Kringen
(74) *Attorney, Agent, or Firm* — Garg Law Firm, PLLC; Rakesh Garg; Nicholas Welling

(57) ABSTRACT

Using a digital twin model of a user, a digital twin model of a geographical location, a digital twin model of an event venue located at the geographical location, and a plurality of digital twin models of clothing items, a product recommendation customized to the user and a planned event is generated, the planned event planned to occur at the event venue. A product recommendation depiction is generated, the product recommendation depiction comprising a depiction of the product recommendation being worn by the user at the planned event. An answer to a natural language query regarding the product recommendation depiction is generated.

20 Claims, 8 Drawing Sheets

(56) References Cited

U.S. PATENT DOCUMENTS

| | | | |
|---|---|---|---|
| 2018/0336183 A1* | 11/2018 | Lee | G06N 5/022 |
| 2019/0287079 A1 | 9/2019 | Shiraishi et al. | |
| 2020/0394699 A1 | 12/2020 | Mueller | |
| 2021/0312259 A1 | 10/2021 | Chang et al. | |
| 2021/0342917 A1 | 11/2021 | Parker et al. | |
| 2021/0358024 A1 | 11/2021 | Beckham | |
| 2022/0292262 A1* | 9/2022 | Japa | G06F 16/90332 |

FOREIGN PATENT DOCUMENTS

| | | |
|---|---|---|
| JP | 5704460 B2 | 4/2015 |
| KR | 101905290 B1 | 10/2018 |
| KR | 102334612 B1 * | 12/2021 |
| WO | 2020202184 A1 | 10/2020 |

OTHER PUBLICATIONS

Kaveh Hassani, Won-Sook Lee, Visualizing Natural Language Descriptions: A Survey; ACM Computing Surveys, vol. 49 Issue 1, Article No. 17, Jun. 2016 Related DOI: https://doi.org/10.1145/2932710 (Year: 2016).*

Velik et al., Emulating the perceptual system of the brain for the purpose of sensor fusion, 2008 Conference on Human System Interactions, pp. 657-662, May 25-27, 2008.

Iuhasz et al., Neural Network Predictions of Stock Price Fluctuations, 2012 14th International Symposium on Symbolic and Numeric Algorithms for Scientific Computing, pp. 505-512, Sep. 26-29, 2012.

Zhang et al., Digital twin system design for dual-manipulator cooperation unit, 2020 IEEE 4th Information Technology, Networking, Electronic and Automation Control Conference (ITNEC), pp. 1431-1434, Jun. 12-14, 2020.

Tao et al., Digital Twin Shop-Floor: A New Shop-Floor Paradigm Towards Smart Manufacturing, IEEE Access, vol. 5, pp. 20418-20427, 2017, Sep. 26, 2017.

Riveret et al., Neuro-Symbolic Agents: Boltzmann Machines and Probabilistic Abstract Argumentation with Sub-Arguments, 2015 International Conference on Autonomous Agents and Multiagent Systems (AAMAS '15), pp. 1481-1489, May 4, 2015.

Chen et al., Improving symbolic regression based on correlation between residuals and variables, 2020 Genetic and Evolutionary Computation Conference (GECCO '20), pp. 922-930, Jun. 26, 2020.

Landsmann et al., Symbolic parametrization of pipe and canal surfaces, 2000 international symposium on Symbolic and algebraic computation (ISSAC '00), pp. 202-208, Jul. 1, 2000.

Kawabe et al., Digital eco-system for online shopping, Fifth International Conference on Management of Emergent Digital EcoSystems (MEDES '13), pp. 33-39, Oct. 28, 2013.

* cited by examiner

DIGITAL AND PHYSICAL EXPERIENCE CORRELATION FOR PRODUCT RECOMMENDATION

BACKGROUND

The present invention relates generally to a method, system, and computer program product for digital and physical experience correlation. More particularly, the present invention relates to a method, system, and computer program product for digital and physical experience correlation for product recommendation.

A physical experience is an experience that takes place in the real, physical world. For example, a physical experience might include a user's traveling to a physical store containing physical goods for sale, examining and touching the physical goods, trying on a physical item of clothing, and the like. A digital experience is an experience that takes place in a computer-generated representation of elements of the physical world. For example, a digital experience might include locating an online site offering physical goods for sale, examining digital images, textual detail, and other computer generated descriptions of the physical goods, "trying on" a representation of a physical item of clothing by viewing a computer generated composite of an image of the shopper and an image of the item, and the like.

SUMMARY

The illustrative embodiments provide a method, system, and computer program product. An embodiment includes a method that generates, using a digital twin model of a user, a digital twin model of a geographical location, a digital twin model of an event venue located at the geographical location, and a plurality of digital twin models of clothing items, a product recommendation customized to the user and a planned event, the planned event planned to occur at the event venue. An embodiment generates a product recommendation depiction, the product recommendation depiction comprising a depiction of the product recommendation being worn by the user at the planned event. An embodiment generates an answer to a natural language query regarding the product recommendation depiction.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
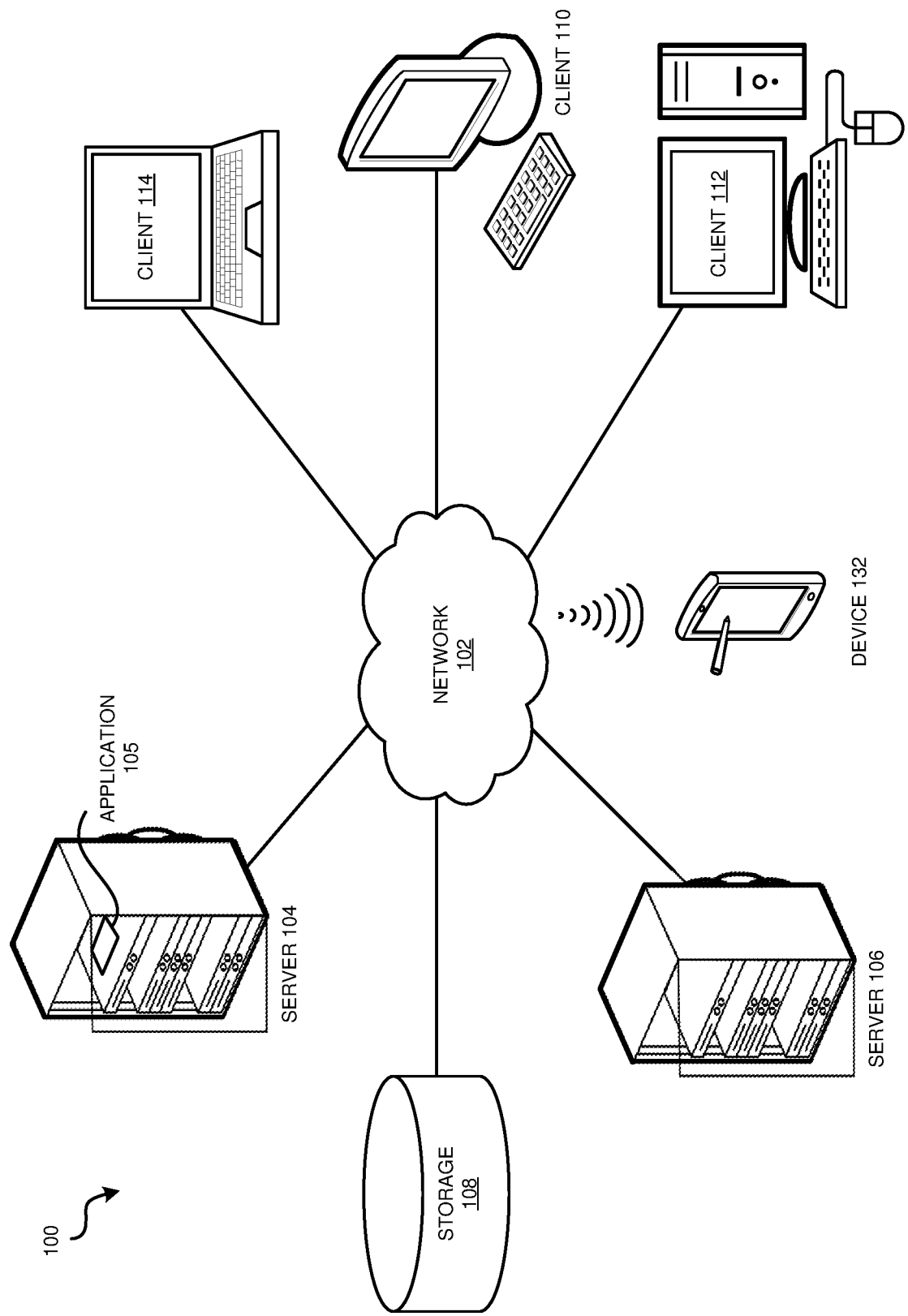
FIG. 1 depicts a block diagram of a network of data processing systems in which illustrative embodiments may be implemented.

The illustrative embodiments recognize that digital and physical experiences are often not well correlated, except in a user's mind. For example, consider a user planning to attend a special event, such as a friend's wedding. The user might be unfamiliar with the venue, necessitating research online. The user might be unfamiliar with the specified dress code, or there might not be a specified dress code, necessitating more online research, consultation of social media networks, or consulting with the user's other friends directly (either in person or via a communications network). Weather might be a factor, requiring additional research (online or not). For example, clothing requirements for an outdoor event in the winter may be different from those for an outdoor event in the summer. The user might ask (via social media or in person) friends who are also attending what they are planning to wear. Thus, a user might use both digital and personal experiences to eventually determine that, for example, a floor-length dress that has sleeves is needed (to meet the dress code), but the dress should not be white (because the bride is wearing white) or pink (because the bridesmaids are wearing pink). The user might determine that flat shoes (because heels would sink into the grassy area in which the wedding is being held) and a bag appropriate to the outfit are also needed. Having determined the shopping list, the user might search online for a physical store stocking a desired item, try on the item at the physical store, buy an additional item online only to return it as unsuitable, consider and reject an item she already has, and repeat the process until the desired outfit is eventually assembled. Thus, the results of the user's digital and physical experiences are rarely well integrated except in the user's mind, and there is an unmet need to improve correlation and integration of the user's physical and digital experiences, particularly to improve product recommendation used in a product purchasing system.

The illustrative embodiments recognize that the presently available tools or solutions do not address these needs or provide adequate solutions for these needs. The illustrative embodiments used to describe the invention generally address and solve the above-described problems and other problems related to digital and physical experience correlation for product recommendation.

An embodiment can be implemented as a software application. The application implementing an embodiment can be configured as a modification of an existing computer-implemented product purchasing system, as a separate application that operates in conjunction with an existing computer-implemented product purchasing system, a standalone application, or some combination thereof.

Particularly, some illustrative embodiments provide a method that generates, using digital twin models of a user, a geographical location, an event venue located at the geographical location, and a plurality of clothing items, a product recommendation customized to the user and a planned event planned to occur at the event venue, generates a product recommendation depiction comprising a depiction of the product recommendation being worn by the user at the planned event, and generates an answer to a natural language query regarding the product recommendation depiction.

A user uses a user interface to opt into use of an embodiment and designate user data that is allowed to be shared, or prohibited from being shared, with an embodiment, or with other specific users or groups of other users. For example, a user planning a surprise party might designate that particular event details be shared with those planning the party, but not with the person who is supposed to be surprised. As another example, a user might designate that only certain users be allowed to see a selected outfit for an upcoming event.

An embodiment constructs a digital twin model of a user. A digital twin model is a virtual representation of a physical object or process, that serves as a real-time digital counterpart of the physical object or process. For example, a digital twin model of a physical object is usable to display changing status of the physical object within a virtual representation. Thus, a digital twin model of a user models the user's dimensions, for use in determining the user's clothing sizes, as well as the user's clothing preferences. In one embodiment, the digital twin model of a user also includes an ability to portray a digital image or video of the user, to aid the user in determining how a particular item of clothing will look when worn by the user. To construct a digital twin model of a user, one embodiment uses data provided by the user—for example, the user's measurements, preferred clothing sizes, and one or more images of the user. To construct a digital twin model of a user, another embodiment uses data of clothing items a user already owns, has selected from a clothing rental or purchase service, or other clothing data the embodiment has access to. Techniques for constructing a digital twin model from a combination of image data, textual data, numerical data, and the results of analytical calculations and modeling are presently known.

An embodiment constructs a digital twin model of one or more geographical locations for which historical weather data is available, using a presently known technique. A digital twin model of a geographical location is usable to determine typical weather, or a weather forecast, for the location on a day and time of an event. For example, a digital twin model of Houston, Texas might be usable to determine that typical weather in July and August is a daily high temperature of 95 degrees Fahrenheit, with a forty percent chance of late afternoon thunderstorms.

An embodiment constructs a digital twin model of an event venue, using a presently known technique. To construct a digital twin model of an event venue, one embodiment uses description data provided by the venue—for example, that one venue is outdoors and includes a grassy area and large shade trees, but does not have a dedicated parking area, while another venue is indoors and has an attached parking garage. To construct a digital twin model of a user, another embodiment uses sensor data of one or more devices used to monitor or control heating or cooling in a venue, for example a thermostat providing data over a network such as the internet. To construct a digital twin model of a user, another embodiment uses social media data from one or more users who attended a previous event at the venue, including image data or users' textual descriptions of an event. For example, images of users attending an event at one venue might portray the venue as being outdoors and including a grassy area and large shade trees, while text messages of users at an indoor venue might include complaints that the venue was too warm.

An embodiment constructs a digital twin model of one or more clothing items, using a presently known technique. To construct a digital twin model of a clothing item, an embodiment uses data such as the item's brand, fabric material, design, style, color, size, dimensions, comfort level in various environmental conditions, image data of the item (e.g. being worn, or lying flat), and the like.

An embodiment receives event data. Event data is data describing an event the user is invited to or plans to attend. Some non-limiting examples of event data are the event date and time, the event location, an event type (e.g. brunch or a wedding), a dress code associated with the event and whether the dress code is required or suggested, and names and contact details of invitees to the event. One embodiment encodes the event data into a QR code or other machine-readable code, which can be sent to a user as part of an invitation to the event. A QR code is a machine-readable code consisting of an array of black and white squares, typically used to encode Uniform Resource Locators (URLs) or other information. A camera on a mobile device is typically configured to scan the QR code, and the mobile device then performs an encoded operation such as accessing a site at an encoded URL or downloading encoded data. One embodiment receives basic event data (e.g. the date, time, and location of the event, or a phrase such as "Jane's wedding"), and obtains additional event data from user profile data (e.g. to determine who Jane is), user calendar data (e.g. the date, time, and location of the event), user social media data (e.g. a recommendation of events to attend), and other publicly available data (e.g. a venue's address and event data).

One embodiment invites the user to an event. Another embodiment does not invite the user to the event; instead, the user provides event data to the embodiment, either via a user interface or by scanning a QR code received as part of an invitation to the event or notice that the event is occurring.

An embodiment generates one or more user- and event-specific product recommendations, such as recommendations of one or more clothing items to wear to the event. To generate a user- and event-specific product recommendation, an embodiment uses digital twin models of a user, the geographical location at which the event is to take place, the event venue, and the clothing items to recommend an item of clothing that meets one or more user and event criteria. For example, if the event dress code was specified as black tie and the user is male, an embodiment might recommend tuxedo components having dimensions fitting the user's dimensions, and if the user is female an embodiment might recommend a specific floor-length dress having dimensions fitting the user's dimensions. If the event venue is outdoors and includes a grassy area or other soft surface, an embodiment might recommend low-heeled shoes matching the dress. And if the event venue is indoors and other venue attendees have previously complained about excessive air conditioning, an embodiment might recommend a dress with long sleeves or a shawl to wear over the dress, for additional warmth. An embodiment is configurable to recommend one or more products a user already has access to, ready-made items available physically nearby or online, instructions for constructing one or more items (e.g. by a tailor or computer-controlled custom manufacturing), or a combination. In embodiments, the product recommendation includes one or more of text describing the product, a URL directing a user to a site at which the product can be viewed or purchased, an image of the product, an explanation of why the product was recommended, and other descriptive data of the product.

As part of a product recommendation, an embodiment generates a digital image, portion of digital video, virtual reality presentation, or augmented reality presentation depicting the user wearing a recommended product at the venue, optionally including lighting and background objects known to be present at the venue. If the user's friends have already indicated (e.g. via social media) that they are also attending the event and what they plan to wear, the product recommendation optionally includes images depicting the user's friends wearing the planned clothing items at the venue, to help the user visualize how the entire group of friends will appear at the event. To generate the depiction, an embodiment uses a presently available technique to match a point on a clothing item to a corresponding point on the user being depicted, based on known dimensions of the user and the item. For example, if a sleeve in a particular size of an item is ten inches long, and the user's arm is twelve inches long, the user's arm should be depicted as protruding a proportional length from a depiction of the sleeve. An embodiment composites together a depiction of the user, an adjusted depiction of a clothing item, and a depiction of the venue, adjusting dimensions, orientations, and lighting of the depicted elements as appropriate to produce a realistic-appearing depiction, even though the event has not yet happened.

An embodiment processes a user query related to the product recommendation or the depiction of the user wearing a recommended product at the venue. An embodiment generates structured representations of one or more scenes or images of physical objects (physical scene representations), by using a convolutional neural network or other presently available image analysis tool to recognize components of the images. For example, a physical scene representation of an image of a user wearing a dress in an outdoor park with trees might include elements such as "dress", "tree", "grass area" and "person" or the user's name. An embodiment also generates structured representations of one or more generated scenes or images (digital scene representations), by using a convolutional neural network or other presently available image analysis tool to recognize components of a generated image. For example, a digital scene representation of a generated product recommendation image depicting a user wearing a recommended product at an event venue might also include elements such as "dress", "tree", "grass area" and "person" or the user's name, just as with the physical scene recommendation.

An embodiment uses a presently known technique to convert a natural language user query to a structured version of the query. A natural language query is a request for information, but need not be in grammatically correct form or expressed in the form of a question. For example, "tell me more about that dress" and "what's with that one" are both natural language queries relating to a particular product recommendation (a dress), and could both be converted to the same structured representation including a request to display more detail about a product code representing the recommended dress. One presently known technique to convert a natural language user query to a structured version of the query uses a word embedding model to convert a word or other portion of natural language text to a corresponding embedding. An embedding is a numerical representation such as a multidimensional vector. The model converts words that are similar to each other to numerical representations that are correspondingly similar to each other.

An embodiment classifies a structured version of a query, selecting a type of scene representation to which the natural language query is related. In one embodiment, the available classifications are one of the physical or digital scene representations, or both. One embodiment uses a deep neural network to classify the structured version of the query. A deep neural network is an artificial neural network including multiple layers between the input and output layers. Configurating a deep neural network to perform classification is a presently available technique.

An embodiment applies the natural language query to banks of long short-term memories (LSTMs) corresponding to types of scene representations to which the natural language query is related. An LSTM is an artificial recurrent neural network architecture that, unlike a feedforward neural network, includes feedback connections. In an embodiment in which the available classifications are one of the physical or digital scene representations, or both, one LSTM was previously trained, using a presently available technique, to convert an input query to a structured query adapted for use on physical scene representations and another LSTM was previously trained, using a presently available technique, to convert an input query to a structured query adapted for use on digital scene representations. An embodiment compares the resulting structured queries based on word similarity using a Bidirectional Encoder Representations from Transformers (BERT) model, a presently available technique for natural language processing that produces contextual embeddings for words or other portions of natural language text. If the original routing classification classifies a query as relating to multiple classifications and the results of corresponding LSTM translations do not have above a threshold similarity to each other, the query is discarded as not sufficiently understood. An embodiment presents a structured query to one or more of the generated scene representations, and uses a neuro-symbolic reasoner symbolic-neural-net, a presently available technique, to reason over a knowledge base to generate an answer to the query.

An embodiment receives feedback from the user. For example, the user might provide feedback that the recommended products were too warm for the actual event, that the user prefers a tighter or looser fit for a particular type of clothing item, or that due to a long walk from the venue's parking, high-heeled shoes were uncomfortable at the event. An embodiment uses the feedback to adjust digital twin models for the user, the geographical location at which the event is to take place, the event venue, and the clothing items as appropriate.

The manner of digital and physical experience correlation for product recommendation described herein is unavailable in the presently available methods in the technological field of endeavor pertaining to a product purchasing system. A method of an embodiment described herein, when implemented to execute on a device or data processing system, comprises substantial advancement of the functionality of that device or data processing system in generating, using digital twin models of a user, a geographical location, an event venue located at the geographical location, and a plurality of clothing items, a product recommendation customized to the user and a planned event planned to occur at the event venue, generating a product recommendation depiction comprising a depiction of the product recommendation being worn by the user at the planned event, and generating an answer to a natural language query regarding the product recommendation depiction.

The illustrative embodiments are described with respect to certain types of models, embedding models, digital twin models, events, geographical locations, venues, clothing items, product recommendations, thresholds, depictions, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system, or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
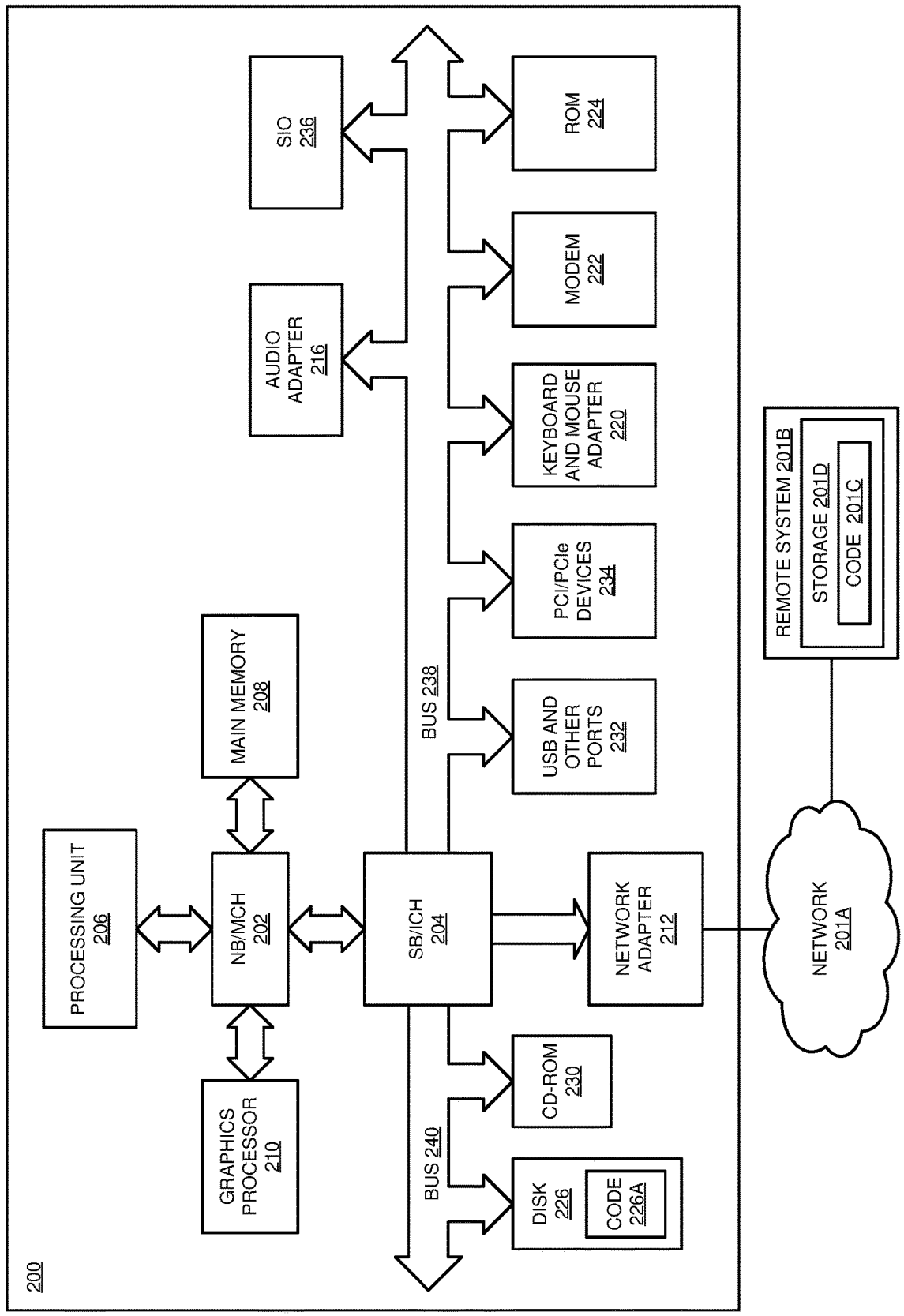
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
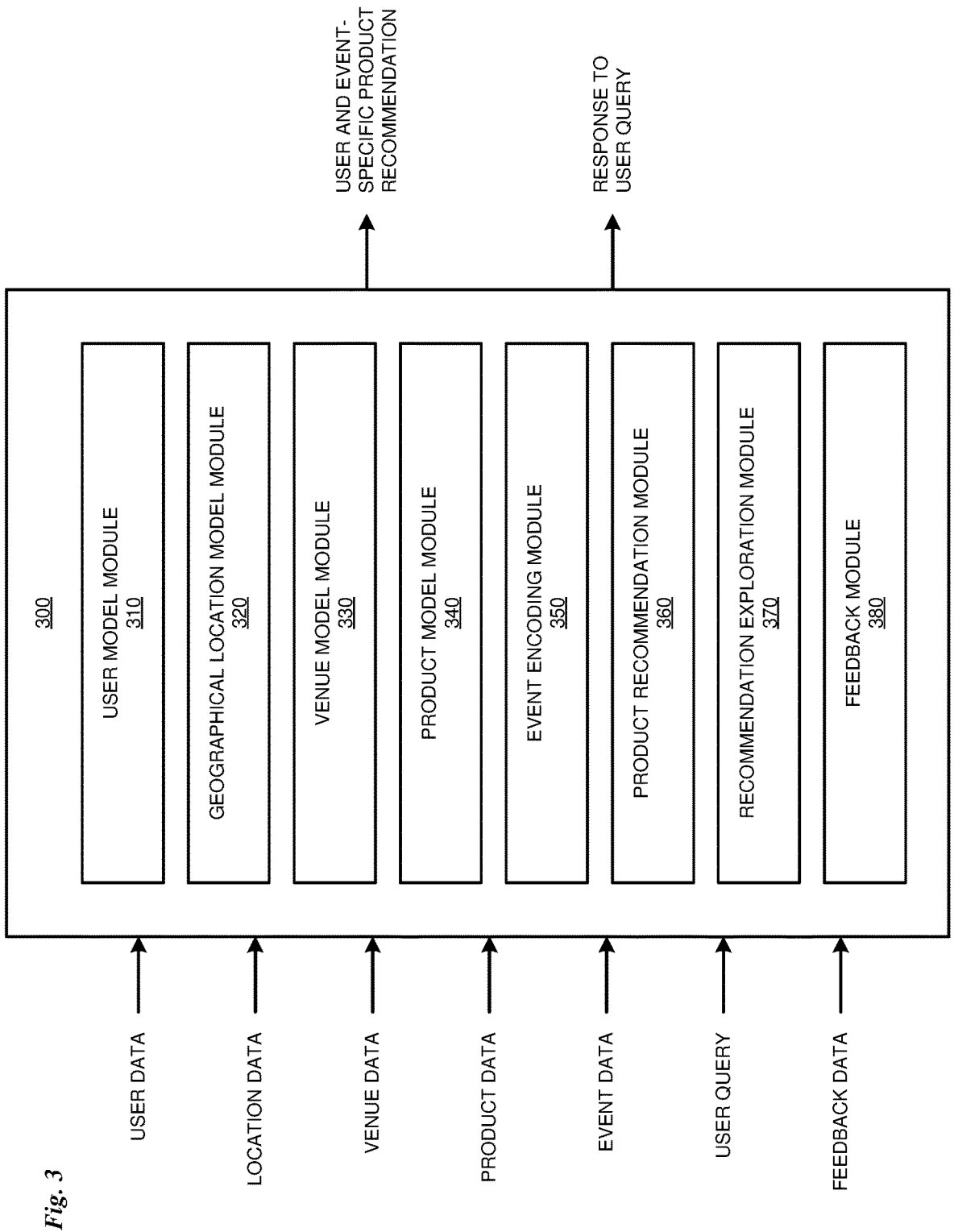
FIG. 3 depicts a block diagram of an example configuration for digital and physical experience correlation for product recommendation in accordance with an illustrative embodiment.

With reference to FIG. 3, this figure depicts a block diagram of an example configuration for digital and physical experience correlation for product recommendation in accordance with an illustrative embodiment. Application 300 is an example of application 105 in FIG. 1 and executes in any of servers 104 and 106, clients 110, 112, and 114, and device 132 in FIG. 1.

User model module 310 constructs a digital twin model of a user. A digital twin model of a user models the user's dimensions, for use in determining the user's clothing sizes, as well as the user's clothing preferences. In one implementation of module 310, the digital twin model of a user also includes an ability to portray a digital image or video of the user, to aid the user in determining how a particular item of clothing will look when worn by the user. To construct a digital twin model of a user, one implementation of module 310 uses data provided by the user—for example, the user's measurements, preferred clothing sizes, and one or more images of the user. To construct a digital twin model of a user, another implementation of module 310 uses data of clothing items a user already owns, has selected from a clothing rental or purchase service, or other clothing data the embodiment has access to.

Geographical location model module 320 constructs a digital twin model of one or more geographical locations for which historical weather data is available, using a presently known technique. A digital twin model of a geographical location is usable to determine typical weather, or a weather forecast, for the location on a day and time of an event. For example, a digital twin model of Houston, Texas might be usable to determine that typical weather in July and August is a daily high temperature of 95 degrees Fahrenheit, with a forty percent chance of late afternoon thunderstorms.

Venue model module 330 constructs a digital twin model of an event venue, using a presently known technique. To construct a digital twin model of an event venue, one implementation of module 330 uses description data provided by the venue—for example, that one venue is outdoors and includes a grassy area and large shade trees, but does not have a dedicated parking area, while another venue is indoors and has an attached parking garage. To construct a digital twin model of a user, another implementation of module 330 uses sensor data of one or more devices used to monitor or control heating or cooling in a venue, for example a thermostat providing data over a network such as the internet. To construct a digital twin model of a user, another implementation of module 330 uses social media data from one or more users who attended a previous event at the venue, including image data or users' textual descriptions of an event. For example, images of users attending an event at one venue might portray the venue as being outdoors and including a grassy area and large shade trees, while text messages of users at an indoor venue might include complaints that the venue was too warm.

Product model module 340 constructs a digital twin model of one or more clothing items, using a presently known technique. To construct a digital twin model of a clothing item, module 340 uses data such as the item's brand, fabric material, design, style, color, size, dimensions, comfort level in various environmental conditions, image data of the item (e.g. being worn, or lying flat), and the like.

Event encoding module 350 receives event data, data describing an event the user is invited to or plans to attend. Some non-limiting examples of event data are the event date and time, the event location, an event type (e.g. brunch or a wedding), a dress code associated with the event and whether the dress code is required or suggested, and names and contact details of invitees to the event. Module 350 encodes the event data into a QR code or other machine-readable code, which can be sent to a user as part of an invitation to the event. One implementation of module 350 receives basic event data (e.g. the date, time, and location of the event, or a phrase such as "Jane's wedding"), and obtains additional event data from user profile data (e.g. to determine who Jane is), user calendar data (e.g. the date, time, and location of the event), user social media data (e.g. a recommendation of events to attend), and other publicly available data (e.g. a venue's address and event data).

One implementation of application 300 invites the user to an event. Another implementation of application 300 does not invite the user to the event; instead, the user provides event data to application 300, either via a user interface or by scanning a QR code received as part of an invitation to the event or notice that the event is occurring.

Product recommendation module 360 generates one or more user- and event-specific product recommendations, such as recommendations of one or more clothing items to wear to the event. To generate a user- and event-specific product recommendation, module 360 uses digital twin models of a user, the geographical location at which the event is to take place, the event venue, and the clothing items to recommend an item of clothing that meets one or more user and event criteria. For example, if the event dress code was specified as black tie and the user is male, module 360 might recommend tuxedo components having dimensions fitting the user's dimensions, and if the user is female module 360 might recommend a specific floor-length dress having dimensions fitting the user's dimensions. If the event venue is outdoors and includes a grassy area or other soft surface, module 360 might recommend low-heeled shoes matching the dress. And if the event venue is indoors and other venue attendees have previously complained about excessive air conditioning, module 360 might recommend a dress with long sleeves or a shawl to wear over the dress, for additional warmth. Module 360 is configurable to recommend one or more products a user already has access to, ready-made items available physically nearby or online, instructions for constructing one or more items (e.g. by a tailor or computer-controlled custom manufacturing), or a combination. In implementations of module 360, the product recommendation includes one or more of text describing the product, a URL directing a user to a site at which the product can be viewed or purchased, an image of the product, an explanation of why the product was recommended, and other descriptive data of the product.

As part of a product recommendation, module 360 generates a digital image, portion of digital video, virtual reality presentation, or augmented reality presentation depicting the user wearing a recommended product at the venue, optionally including lighting and background objects known to be present at the venue. If the user's friends have already indicated (e.g. via social media) that they are also attending the event and what they plan to wear, the product recommendation optionally includes images depicting the user's friends wearing the planned clothing items at the venue, to help the user visualize how the entire group of friends will appear at the event. To generate the depiction, module 360 uses a presently available technique to match a point on a clothing item to a corresponding point on the user being depicted, based on known dimensions of the user and the item. For example, if a sleeve in a particular size of an item is ten inches long, and the user's arm is twelve inches long, the user's arm should be depicted as protruding a proportional length from a depiction of the sleeve. Module 360 composites together a depiction of the user, an adjusted depiction of a clothing item, and a depiction of the venue, adjusting dimensions, orientations, and lighting of the depicted elements as appropriate to produce a realistic-appearing depiction, even though the event has not yet happened.

Recommendation exploration module 370 processes a user query related to the product recommendation or the depiction of the user wearing a recommended product at the venue. Module 370 generates structured representations of one or more scenes or images of physical objects (physical scene representations), by using a convolutional neural network or other presently available image analysis tool to recognize components of the images. For example, a physical scene representation of an image of a user wearing a dress in an outdoor park with trees might include elements such as "dress", "tree", "grass area" and "person" or the user's name. Module 370 also generates structured representations of one or more generated scenes or images (digital scene representations), by using a convolutional neural network or other presently available image analysis tool to recognize components of a generated image. For example, a digital scene representation of a generated product recommendation image depicting a user wearing a recommended product at an event venue might also include elements such as "dress", "tree", "grass area" and "person" or the user's name, just as with the physical scene recommendation.

Module 370 uses a presently known technique to convert a natural language user query to a structured version of the query. Module 370 classifies a structured version of a query, selecting a type of scene representation to which the natural language query is related. In one implementation of module 370, the available classifications are one of the physical or digital scene representations, or both. One implementation of module 370 uses a deep neural network to classify the structured version of the query.

Module 370 applies the natural language query to banks of long short-term memories (LSTMs) corresponding to types of scene representations to which the natural language query is related. In an implementation of module 370 in which the available classifications are one of the physical or digital scene representations, or both, one LSTM was previously trained to convert an input query to a structured query adapted for use on physical scene representations and another LSTM was previously trained to convert an input query to a structured query adapted for use on digital scene representations. Module 370 compares the resulting structured queries based on word similarity using a BERT model that produces contextual embeddings for words or other portions of natural language text. If the original routing classification classifies a query as relating to multiple classifications and the results of corresponding LSTM translations do not have above a threshold similarity to each other, the query is discarded as not sufficiently understood. Module 370 presents a structured query to one or more of the generated scene representations, and generates an answer to the query.

Feedback module 380 receives feedback from the user. For example, the user might provide feedback that the recommended products were too warm for the actual event, that the user prefers a tighter or looser fit for a particular type of clothing item, or that due to a long walk from the venue's parking, high-heeled shoes were uncomfortable at the event. Module 380 uses the feedback to adjust digital twin models for the user, the geographical location at which the event is to take place, the event venue, and the clothing items as appropriate.

Figure 4:
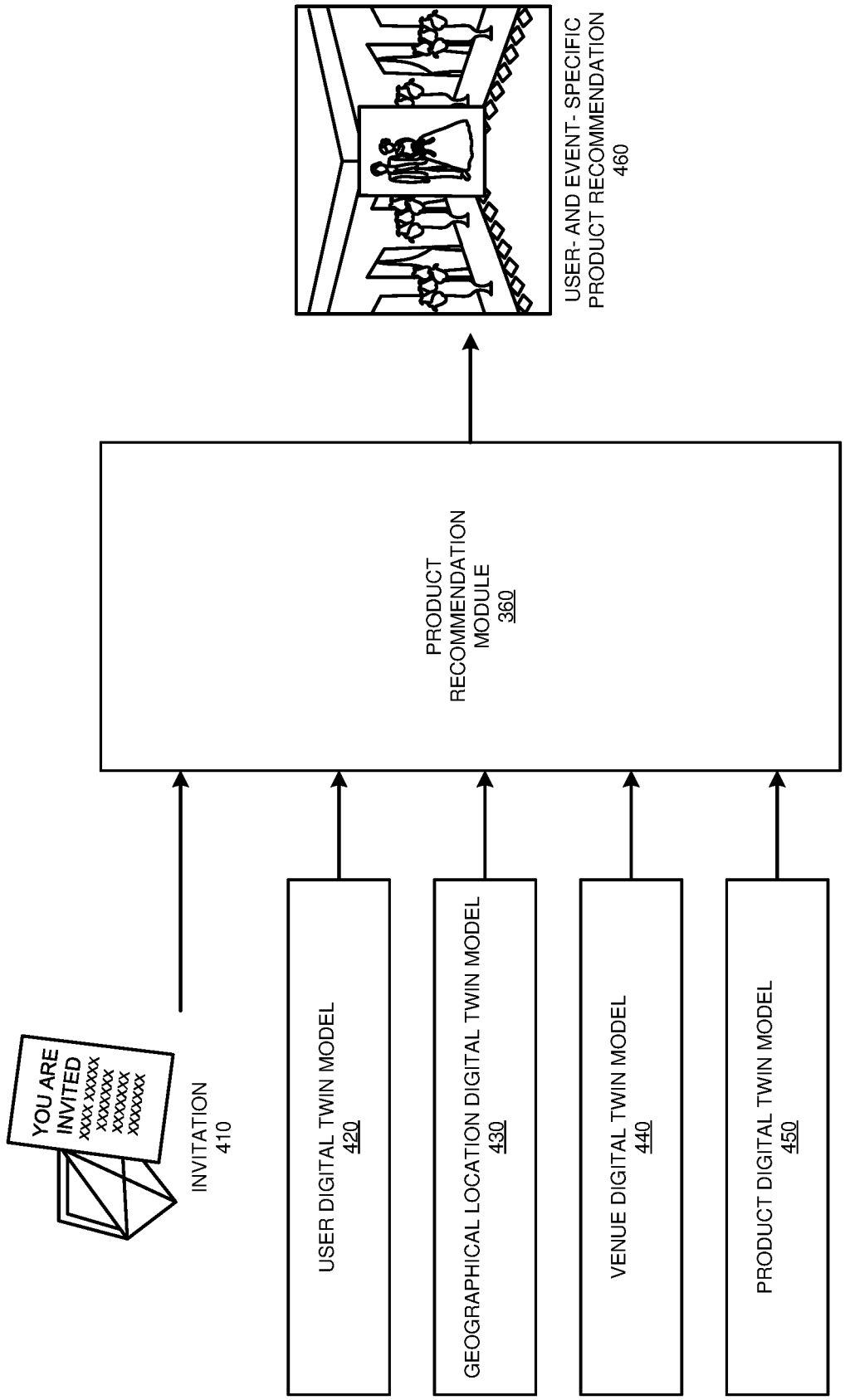
FIG. 4 depicts an example of digital and physical experience correlation for product recommendation in accordance with an illustrative embodiment.

With reference to FIG. 4, this figure depicts an example of digital and physical experience correlation for product recommendation in accordance with an illustrative embodiment. The example can be executed using application 300 in FIG. 3. Product recommendation module 360 is the same as product recommendation module 360 in FIG. 3.

Product recommendation module 360 generates user- and event-specific product recommendation 460, a recommendation of one or more clothing items to wear to an event. Recommendation 460 includes a depiction of the user wearing a recommended product at the venue, optionally including lighting and background objects known to be present at the venue and optionally including depictions of the user's friends wearing their planned clothing items at the venue. To generate recommendation 460, module 360 uses invitation 410 (including a QR code encoding event data), user digital twin model 420, geographical location digital twin model 430, event venue digital twin model 440, and product digital twin model 450.

Figure 5:
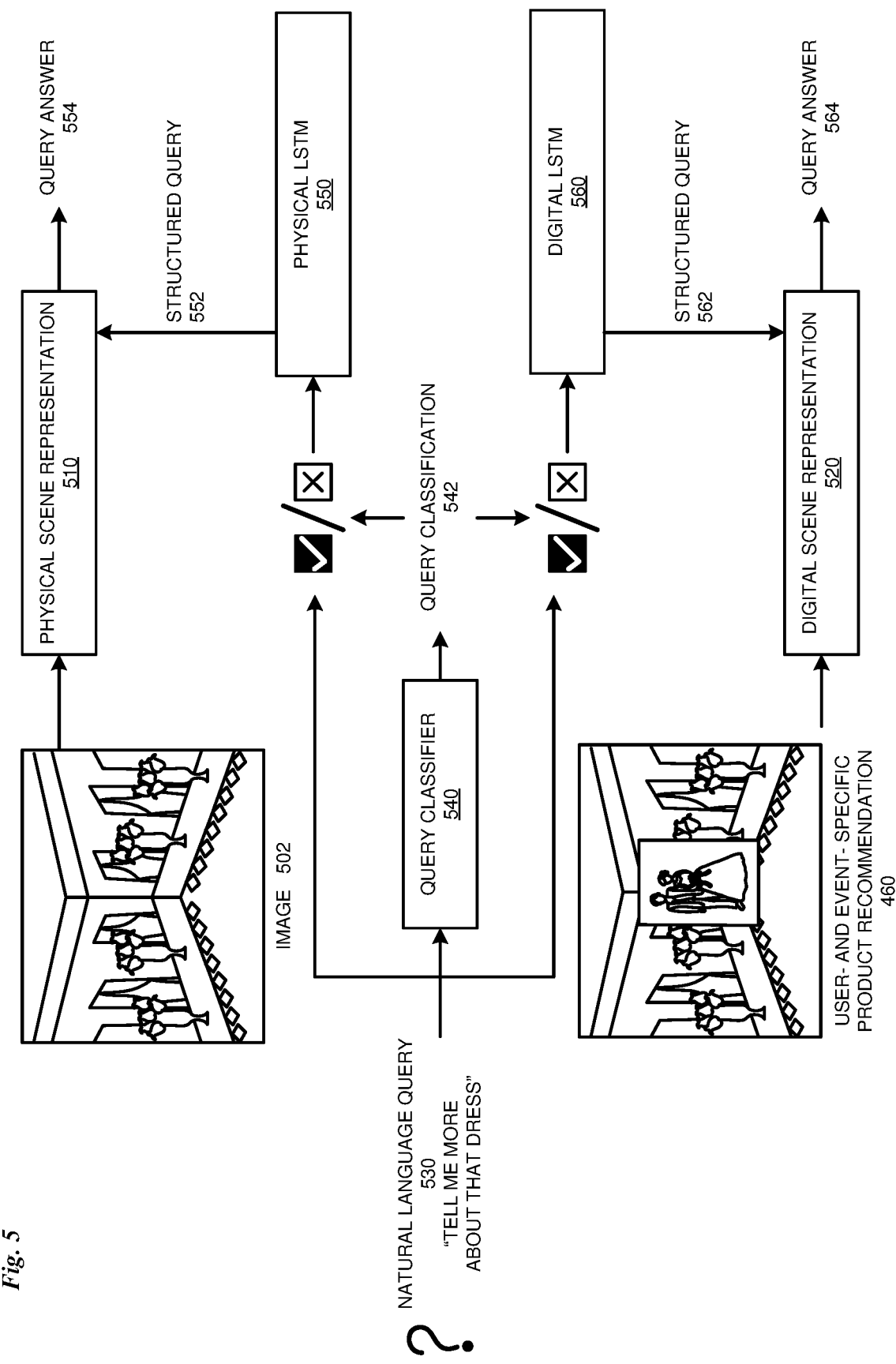
FIG. 5 depicts a continued example of digital and physical experience correlation for product recommendation in accordance with an illustrative embodiment.

With reference to FIG. 5, this figure depicts a continued example of digital and physical experience correlation for product recommendation in accordance with an illustrative embodiment. The example can be executed using application 300 in FIG. 3. User- and event-specific product recommendation 460 is the same as user- and event-specific product recommendation 460 in FIG. 4.

Application 300 generates physical scene representation 510, a structured representation of image 502 (an image of physical objects), by using a convolutional neural network or other presently available image analysis tool to recognize image components. Application 300 also generates digital scene representation 520, a structured representation of recommendation 460 (an image of digital, generated objects), by using a convolutional neural network or other presently available image analysis tool to recognize image components.

Query classifier 540 classifies natural language query 530, producing query classification 542. If query 530 was classified as relating to physical scene representation 510, query 530 is applied to physical LSTM 550. Physical LSTM 550 was previously trained to convert an input query to a structured query adapted for use on physical scene representations. Thus, physical LSTM 550 produces structured query 552. Structured query 552 is applied to physical scene representation 510, producing query answer 554. If query 530 was classified as relating to digital scene representation 520, query 530 is applied to digital LSTM 560. Digital LSTM 560 was previously trained to convert an input query to a structured query adapted for use on digital scene representations. Thus, digital LSTM 560 produces structured query 562. Structured query 562 is applied to digital scene representation 520, producing query answer 564. However, if query 530 was classified as relating to multiple classifications and structured queries 552 and 554 do not have above a threshold similarity to each other, query 530 is discarded as not sufficiently understood.

Figure 6:
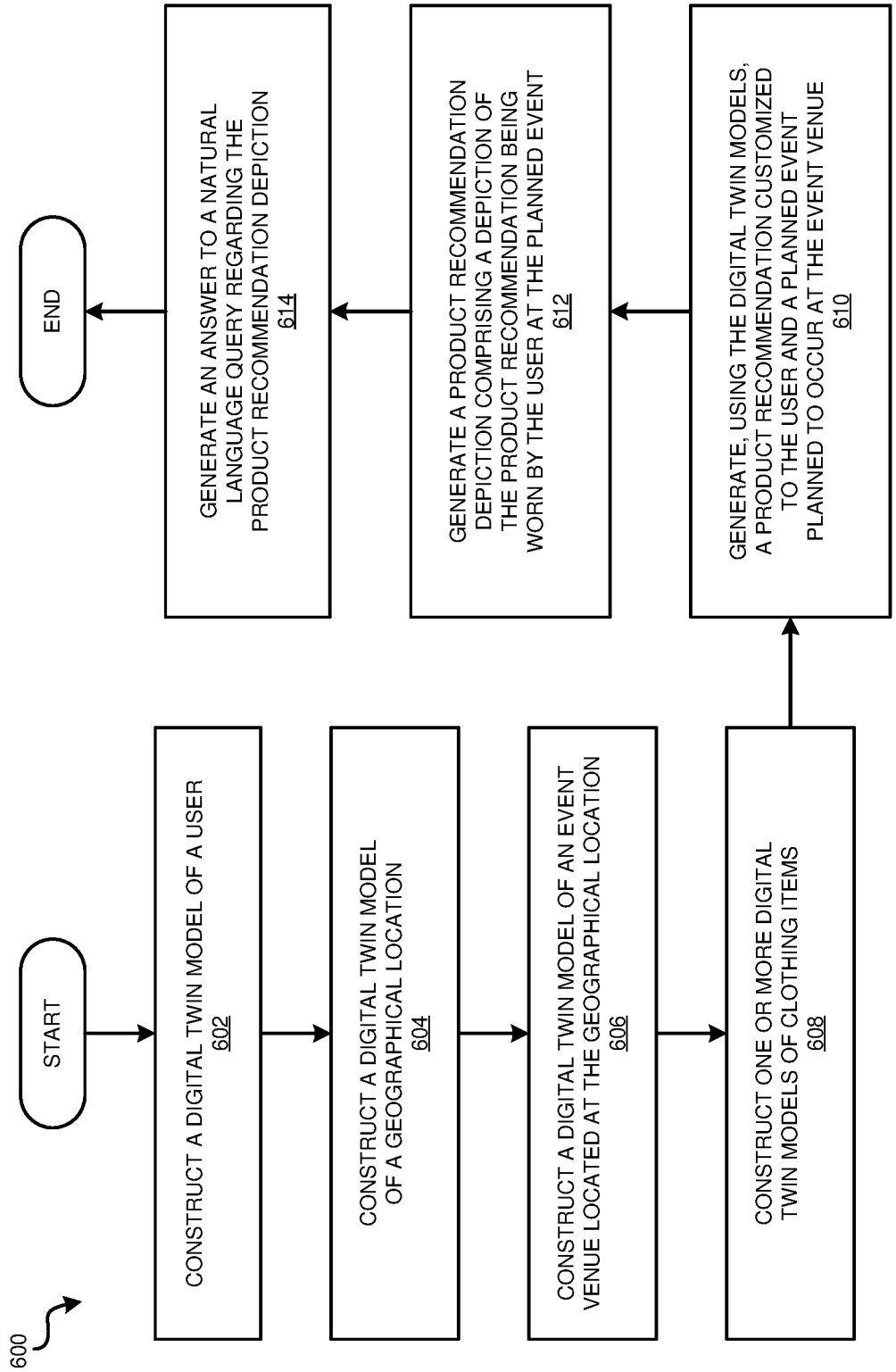
FIG. 6 depicts a flowchart of an example process for digital and physical experience correlation for product recommendation in accordance with an illustrative embodiment.

With reference to FIG. 6, this figure depicts a flowchart of an example process for digital and physical experience correlation for product recommendation in accordance with an illustrative embodiment. Process 600 can be implemented in application 300 in FIG. 3.

In block 602, the application constructs a digital twin model of a user. In block 604, the application constructs a digital twin model of a geographical location. In block 606, the application constructs a digital twin model of an event venue located at the geographical location. In block 608, the application constructs one or more digital twin models of clothing items. In block 610, the application generates, using the digital twin models, a product recommendation customized to the user and a planned event planned to occur at the event venue. In block 612, the application generates a product recommendation depiction comprising a depiction of the product recommendation being worn by the user at the planned event. In block 614, the application generates an answer to a natural language query regarding the product recommendation depiction. Then the application ends.

Figure 7:
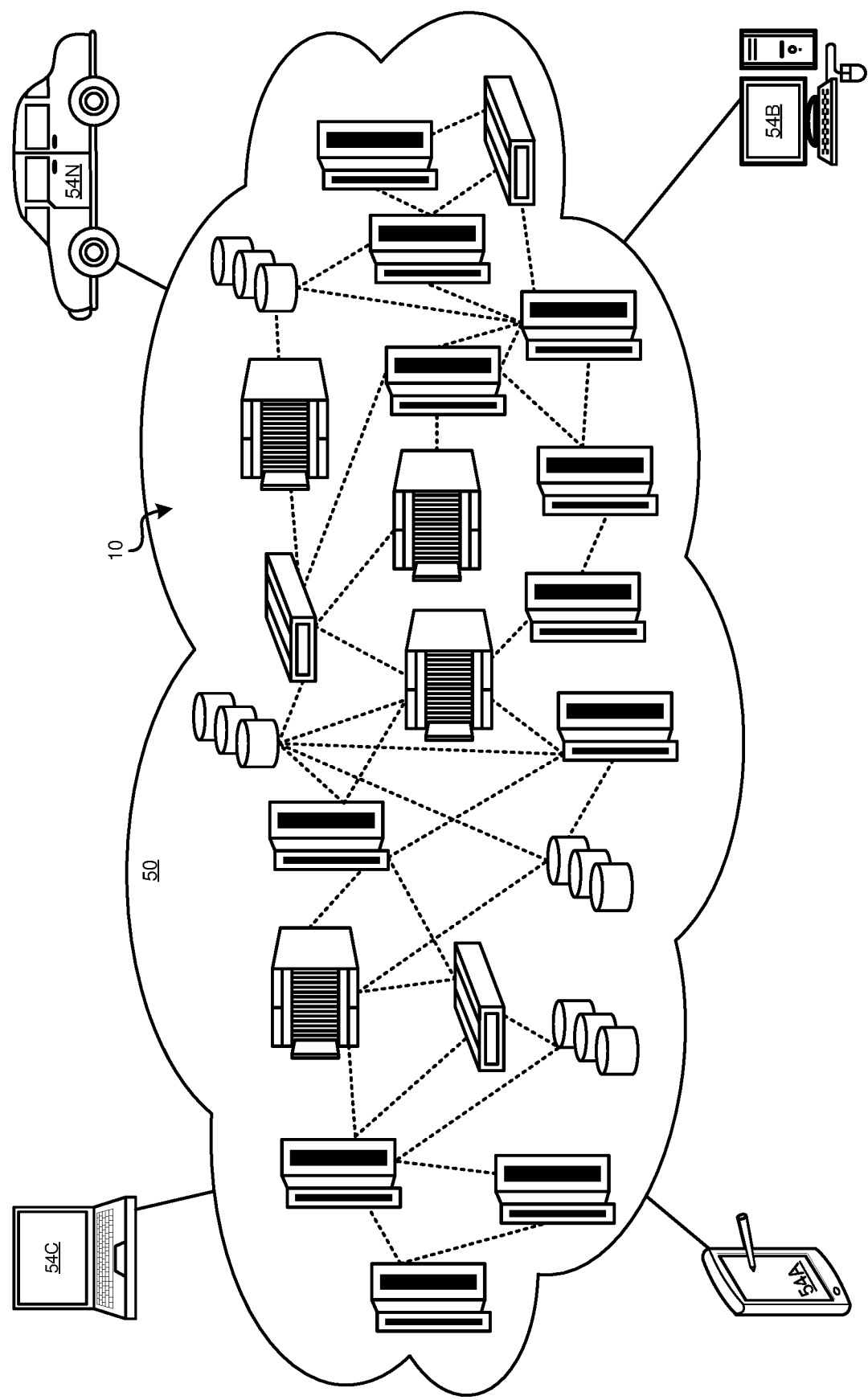
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
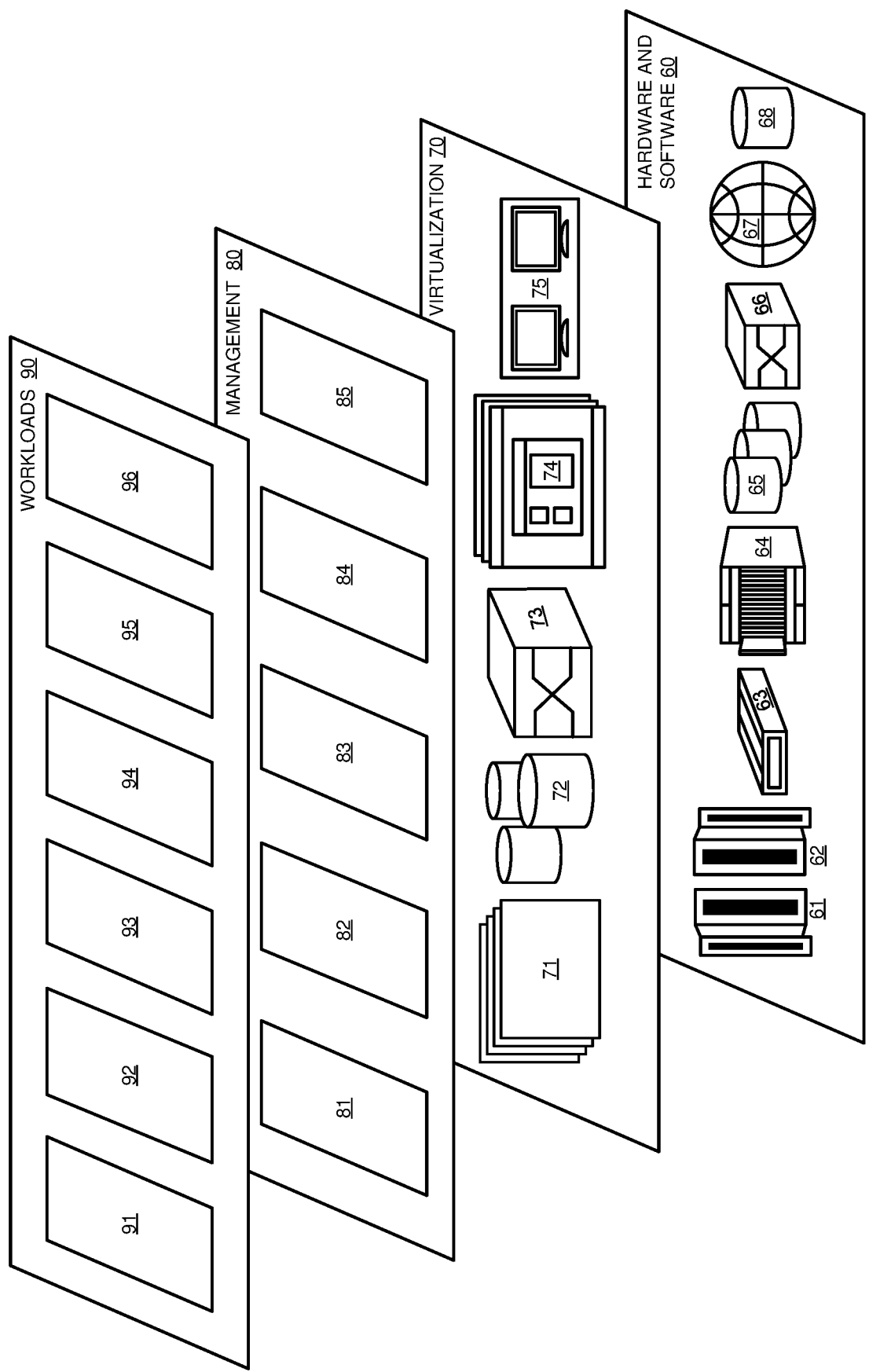
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for digital and physical experience correlation for product recommendation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
generating, using a digital twin model of a user, a digital twin model of a geographical location, a digital twin model of an event venue located at the geographical location, and a plurality of digital twin models of clothing items, a product recommendation customized to the user and a planned event, the planned event planned to occur at the event venue, wherein the digital twin model of the event venue is based at least in part on social media text data of one or more users who attended a previous event at the event venue, wherein the product recommendation is further customized based on the social media text data;
generating a product recommendation depiction, the product recommendation depiction comprising a depiction of the product recommendation being worn by the user at the planned event; and
generating an answer to a natural language query regarding the product recommendation depiction.

2. The computer-implemented method of claim 1, wherein generating the answer to the natural language query further comprises:
classifying a structured representation of the natural language query, the classifying selecting a type of scene representation to which the natural language query is related;
generating, using a bank of long short-term memories trained according to the selected type of scene representation to which the natural language query is related, a second structured representation of the natural language query; and generating an answer to the second structured representation of the natural language query.

3. The computer-implemented method of claim 2, further comprising:
generating, using a first embedding model, a structured representation of the natural language query from the natural language query.

4. The computer-implemented method of claim 2, further comprising:
selecting a plurality of types of scene representation to which the natural language query is related;
generating, for each type of scene representation in the plurality of types of scene representation, a corresponding structured representation of the natural language query, the corresponding structured representation generated using a bank of long short-term memories trained according to the type of scene representation; and
generating, responsive to determining that the corresponding structured representations of the natural language query have above a threshold similarity to each other, an answer to the corresponding structured representations of the natural language query.

5. The computer-implemented method of claim 4, wherein determining that the corresponding structured representations of the natural language query have above the threshold similarity to each other is performed using a Bidirectional Encoder Representations from Transformers embedding model.

6. The computer-implemented method of claim 1, wherein the digital twin model comprising a virtual representation of a set of physical characteristics of the user.

7. A computer program product for experience correlation for product recommendation, the computer program product comprising one or more non-transitory computer-readable storage devices storing program instructions, the program instructions when executed by a computer:
generate, using a digital twin model of a user, a digital twin model of a geographical location, a digital twin model of an event venue located at the geographical location, and a plurality of digital twin models of clothing items, a product recommendation customized to the user and a planned event, the planned event planned to occur at the event venue, wherein the digital twin model of the event venue is based at least in part on social media text data of one or more users who attended a previous event at the event venue, wherein the product recommendation is further customized based on the social media text data;
generate a product recommendation depiction, the product recommendation depiction comprising a depiction of the product recommendation being worn by the user at the planned event; and
generate an answer to a natural language query regarding the product recommendation depiction.

8. The computer program product of claim 7, wherein program instructions to generate the answer to the natural language query further comprises:
program instructions to classify a structured representation of the natural language query, the classifying selecting a type of scene representation to which the natural language query is related;
program instructions to generate, using a bank of long short-term memories trained according to the selected type of scene representation to which the natural language query is related, a second structured representation of the natural language query; and program instructions to generate an answer to the second structured representation of the natural language query.

9. The computer program product of claim 8, the stored program instructions further comprising:
program instructions to generate, using a first embedding model, a structured representation of the natural language query from the natural language query.

10. The computer program product of claim 8, the stored program instructions further comprising:
program instructions to select a plurality of types of scene representation to which the natural language query is related;
program instructions to generate, for each type of scene representation in the plurality of types of scene representation, a corresponding structured representation of the natural language query, the corresponding structured representation generated using a bank of long short-term memories trained according to the type of scene representation; and
program instructions to generate, responsive to determining that the corresponding structured representations of the natural language query have above a threshold similarity to each other, an answer to the corresponding structured representations of the natural language query.

11. The computer program product of claim 10, wherein determining that the corresponding structured representations of the natural language query have above the threshold similarity to each other is performed using a Bidirectional Encoder Representations from Transformers embedding model.

12. The computer program product of claim 7, wherein the digital twin model comprising a virtual representation of a set of physical characteristics of the user.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to generate, using a digital twin model of a user, a digital twin model of a geographical location, a digital twin model of an event venue located at the geographical location, and a plurality of digital twin models of clothing items, a product recommendation customized to the user and a planned event, the planned event planned to occur at the event venue wherein the digital twin model of the event venue is based at least in part on social media text data of one or more users who attended a previous event at the event venue, wherein the product recommendation is further customized based on the social media text data;

program instructions to generate a product recommendation depiction, the product recommendation depiction comprising a depiction of the product recommendation being worn by the user at the planned event; and program instructions to generate an answer to a natural language query regarding the product recommendation depiction.

17. The computer system of claim 16, wherein program instructions to generate the answer to the natural language query further comprises:

program instructions to classify a structured representation of the natural language query, the classifying selecting a type of scene representation to which the natural language query is related;

program instructions to generate, using a bank of long short-term memories trained according to the selected type of scene representation to which the natural language query is related, a second structured representation of the natural language query; and program instructions to generate an answer to the second structured representation of the natural language query.

18. The computer system of claim 17, the stored program instructions
further comprising:
program instructions to generate, using a first embedding model, a structured representation of the natural language query from the natural language query.

19. The computer system of claim 17 the stored program instructions
further comprising:
program instructions to select a plurality of types of scene representation to which the natural language query is related;

program instructions to generate, for each type of scene representation in the plurality of types of scene representation, a corresponding structured representation of the natural language query, the corresponding structured representation generated using a bank of long short-term memories trained according to the type of scene representation; and program instructions to generate, responsive to determining that the corresponding structured representations of the natural language query have above a threshold similarity to each other, an answer to the corresponding structured representations of the natural language query.

20. The computer system of claim 19, wherein determining that the corresponding structured representations of the natural language query have above the threshold similarity to each other is performed using a Bidirectional Encoder Representations from Transformers embedding model.

\* \* \* \* \*